US008763864B2

(12) United States Patent
Duquet

(10) Patent No.: US 8,763,864 B2
(45) Date of Patent: Jul. 1, 2014

(54) FLUID PRODUCT DISTRIBUTOR

(75) Inventor: Frederic Duquet, Thibouville (FR)

(73) Assignee: Aptar France SAS, Le Neubourg (FR)

( * ) Notice: Subject to any disclaimer, the term of this patent is extended or adjusted under 35 U.S.C. 154(b) by 1028 days.

(21) Appl. No.: 12/593,215

(22) PCT Filed: Mar. 28, 2008

(86) PCT No.: PCT/FR2008/050544
§ 371 (c)(1), (2), (4) Date: Sep. 25, 2009

(87) PCT Pub. No.: WO2008/132413
PCT Pub. Date: Nov. 6, 2008

(65) Prior Publication Data

US 2010/0108720 A1 May 6, 2010

(30) Foreign Application Priority Data

Mar. 29, 2007 (FR) ..................................... 07 54117

(51) Int. Cl.
*G01F 11/00* (2006.01)
*B05B 11/00* (2006.01)

(52) U.S. Cl.
CPC ......... *B05B 11/3061* (2013.01); *B05B 11/3063* (2013.01); *B05B 11/3001* (2013.01)
USPC ....................................... 222/321.1; 222/340

(58) Field of Classification Search
CPC ........................ B05B 11/3063; B05B 11/3061
USPC ................ 222/321.1, 321.2, 491, 492, 321.7, 222/321.9, 312.3, 312.8, 340, 341
See application file for complete search history.

(56) References Cited

U.S. PATENT DOCUMENTS

| | | | | | |
|---|---|---|---|---|---|
| 4,317,531 | A | | 3/1982 | Saito et al. | |
| 4,369,900 | A | | 1/1983 | Saito et al. | |
| 4,936,492 | A | * | 6/1990 | Amiel et al. | 222/207 |
| 5,092,495 | A | * | 3/1992 | Andre | 222/341 |
| 5,423,459 | A | * | 6/1995 | Cater | 222/321.8 |
| 5,626,264 | A | | 5/1997 | Florez et al. | |
| 7,287,672 | B2 | * | 10/2007 | Garcia | 222/321.8 |
| 7,789,274 | B2 | * | 9/2010 | Garcia | 222/321.7 |
| 2004/0251280 | A1 | * | 12/2004 | Crosnier et al. | 222/321.9 |

FOREIGN PATENT DOCUMENTS

| | | | |
|---|---|---|---|
| EP | 0 000 313 | A1 | 1/1979 |
| FR | 2 864 046 | A1 | 6/2005 |

* cited by examiner

*Primary Examiner* — Lien Ngo
(74) *Attorney, Agent, or Firm* — Sughrue Mion, PLLC

(57) ABSTRACT

A fluid dispenser comprising: a fluid reservoir (1) provided with an opening (10); and a dispenser member (2, 3, 4, 5, 6), such as a pump or a valve, mounted on the opening (10) of the reservoir, the member forming a fluid chamber (C) that is provided with an inlet valve (28, 43), an outlet valve (47, 511), and a lip (42) that is movable in leaktight sliding in a cylinder (27) between a rest position and a depressed position, so as to cause the volume of the chamber (C) to vary, and the fluid in the chamber to be driven through the outlet valve towards a dispenser orifice (50); said container being characterized in that, in the proximity of the depressed position, the inlet valve defines a first escape path (F1) that puts the reservoir (1) into communication with the chamber (C), the chamber, in the proximity of the depressed position, communicating with the outside through a second escape path (F2) that passes via the outlet valve and the dispenser orifice so that, in the proximity of the depressed position, the reservoir (1) and the chamber communicate with the outside through the open first and second escape paths (F1 and F2), and with the outlet valve closed.

14 Claims, 2 Drawing Sheets

FLUID PRODUCT DISTRIBUTOR

Figure 1:
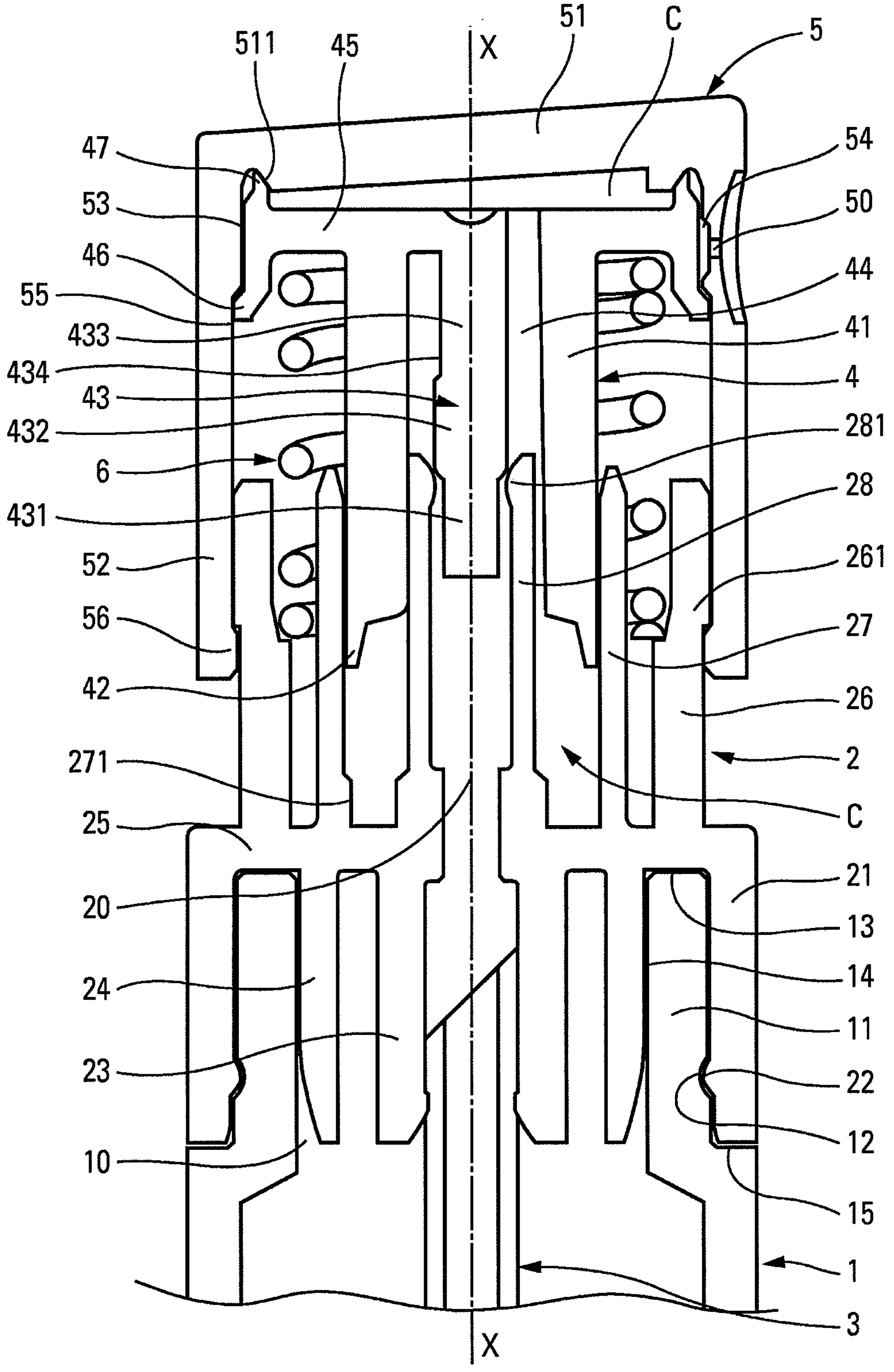

The present invention relates to a fluid dispenser comprising a reservoir provided with an opening, and a dispenser member, such as a pump or a valve, mounted in the opening of the reservoir. This type of portable manual dispenser is frequently used in the fields of perfumery, cosmetics, or even pharmacy.

In the prior art, document WO 2005/070560 is already known that describes a fluid dispenser having a dispenser member that is a pump and that comprises: a body provided with fastener means for fastening on a reservoir neck; a pusher that forms the dispenser orifice, and on which the user can press so as to actuate the pump; and a differential piston that is housed inside the pusher and that slides in a cylinder that is formed by the body. A pre-compression and return spring bears against the body and urges the differential piston towards the pusher, moving away from the body. The pump chamber formed by the dispenser member extends on either side of the differential piston: by pressing on the pusher by means of one or more fingers, the differential piston is moved against the spring both relative to the body and to the pusher, hence its differential characteristic. The movement of the differential piston relative to the pusher makes it possible to free a dispenser orifice via which the fluid under pressure inside the chamber can escape and can advantageously be dispensed in spray form.

The dispenser described in document WO 2005/070560 presents small dimensions with a reservoir of about a few milliliters. The dispenser is rather like a sample dispenser. While the pump is being mounted in the opening of the reservoir, it creates increased pressure inside the reservoir. This results from the fact that the body of the pump slides in leaktight manner into the reservoir opening over a certain height. In this way, the body performs an unwanted piston function: indeed that increased pressure phenomenon is commonly referred to as “pistoning”.

Consequently, a first object of the present invention is to attenuate or to eliminate the increase in pressure inside the reservoir while the dispenser is being assembled.

Another problem that frequently occurs with that type of dispenser is priming the pump, i.e. initially filling the pump chamber with fluid from the reservoir. Initially, after mounting the pump on the reservoir, the pump chamber is full of air. By actuating the pusher, the volume of the pump chamber is reduced, and in this way the air inside it is compressed. However, the pressure reached inside the chamber is often not enough to open the outlet valve in such a manner as to enable the air held captive in the chamber to be driven to the outside through the dispenser orifice. It is often necessary to actuate the pusher several times in order to fill, i.e. prime, the pump chamber. Sometimes, priming is not even possible.

Consequently, another object of the present invention is to make priming the pump chamber easy and rapid. Preferably, the present invention should make it possible both to eliminate the increased pressure that exists in the reservoir and to prime the pump during a simple, single operation that can be implemented easily while the dispenser is being assembled.

To achieve these objects, the present invention proposes a fluid dispenser comprising: a fluid reservoir provided with an opening; and a dispenser member, such as a pump or a valve, mounted on the opening of the reservoir, the member forming a fluid chamber that is provided with an inlet valve, an outlet valve, and a lip that is movable in leaktight sliding in a cylinder between a rest position and a depressed position, so as to cause the volume of the chamber to vary, and the fluid in the chamber to be driven through the outlet valve towards a dispenser orifice; said dispenser being characterized in that, in the proximity of the depressed position, the inlet valve defines a first escape path that puts the reservoir into communication with the chamber, the chamber, in the proximity of the depressed position, communicating with the outside through a second escape path that passes via the outlet valve and the dispenser orifice so that, in the proximity of the depressed position, the reservoir and the chamber communicate with the outside through the open first and second escape paths, and with the outlet valve closed. Thus, the increased pressure that exists in the reservoir can be reduced or eliminated by communicating with the chamber, and the compressed air inside the chamber can escape to the outside, without passing through the outlet valve. In short, the pressures inside the dispenser are completely compensated with atmospheric pressure.

In an advantageous characteristic, the first escape path is opened before the second escape path so that the chamber communicates with the reservoir before it communicates with the outside. Thus, initially, the pressure that exists in the reservoir is balanced with the pressure that exists in the chamber, and subsequently, the common pressure that exists in the reservoir and in the chamber is balanced with the outside. The first and second escape paths are established by bringing the pusher towards its depressed position. This can be performed while the dispenser member is being mounted on the opening of the reservoir, by means of a press pressing on the pusher. The press begins by driving the pusher fully into its depressed position before the dispenser member is mounted in the opening of the reservoir. Thus, the two escape paths are established even before any increased pressure can be generated inside the reservoir. By continuing to press on the pusher, with both escape paths open, the dispenser member is brought into its final mounting position in the opening of the reservoir. The press then relaxes its pressure on the pusher, which returns into its rest position. During the return stroke, the second escape path is closed before the first escape path. Then, the inlet valve performs its normal function, creating a vacuum inside the chamber that makes it possible to suck fluid from the reservoir.

The dispenser member is thus primed as soon as it is mounted on the reservoir. In addition, any increased pressure inside the reservoir is prevented.

In addition, in normal operation, i.e. after the dispenser member has been primed, staggering the establishment or opening of the escape paths makes it possible to eliminate any risk of fluid leaking out of the chamber. Given that the first escape path is opened before the second escape path, fluid under pressure inside the chamber C at the end of stroke of the pusher is driven through the first escape path towards the reservoir, and not through the second escape path that opens subsequently. It is thus this time sequence of the openings of the escape paths that makes it possible to avoid any risk of fluid leaking during normal operation of the dispenser.

In a practical embodiment, the sliding of the lip against the cylinder ceases to be leaktight in the proximity of the depressed position, so as to establish the second escape path. Preferably, the cylinder forms at least one discontinuity over which the lip passes, thereby creating the second escape path. The function of the discontinuity(ies) is to release, at least locally, the lip from the cylinder, so as to create a sealing fault that serves as an escape path for the air under pressure.

In another practical aspect of the invention, the inlet valve comprises two elements that are engaged to slide in leaktight manner one inside the other, except in the rest position in which the valve is open, and in the proximity of the depressed position so as to establish the first escape path. Advantageously, one of the elements forms at least one profile over which the other element passes, thereby creating the first escape path. Once again, the function of the profile(s) is to create a local break in sealing that serves as an escape path for the air under pressure and possibly for the fluid under pressure.

In a practical embodiment, the dispenser member comprises: a body for mounting on the opening of the reservoir, the body forming the cylinder; a pusher that is axially movable down and up on the body between the rest position and the depressed position; and a differential piston including a first lip that is engaged to slide in leaktight manner in the cylinder of the body, and a second lip that is engaged to slide in leaktight manner in the pusher. Advantageously, the body forms an inlet pipe, and the differential piston forms a rod that is engaged to slide in leaktight manner in the pipe in such a manner as to co-operate to define the inlet valve, the rod forming at least one profile where the pipe is not in leaktight contact, thereby establishing the first escape path. In another advantageous aspect, the dispenser member includes a spring that urges the differential piston towards the pusher, away from the body. According to another advantageous characteristic, the dispenser member includes a self-sealing cuff that comes into leaktight sliding contact with the opening of the reservoir while the dispenser member is being mounted on the reservoir.

It is the leaktight-contact stroke of the cuff in the opening of the reservoir that holds the air captive inside the reservoir and causes its pressure to rise considerably in the absence of the two established escape paths of the invention.

The present invention solves both the problem of increased pressure in the reservoir and the problem of priming the dispenser member, but without creating a risk of fluid leaking. The present invention preferably applies to pumps, but it can also apply to valves. In addition, it preferably applies to small-capacity dispensers such as sample dispensers, but it can also apply to any other large-capacity dispenser.

The invention is described more fully below with reference to the accompanying drawings which show an embodiment of the invention by way of non-limiting example.

Figure 2:
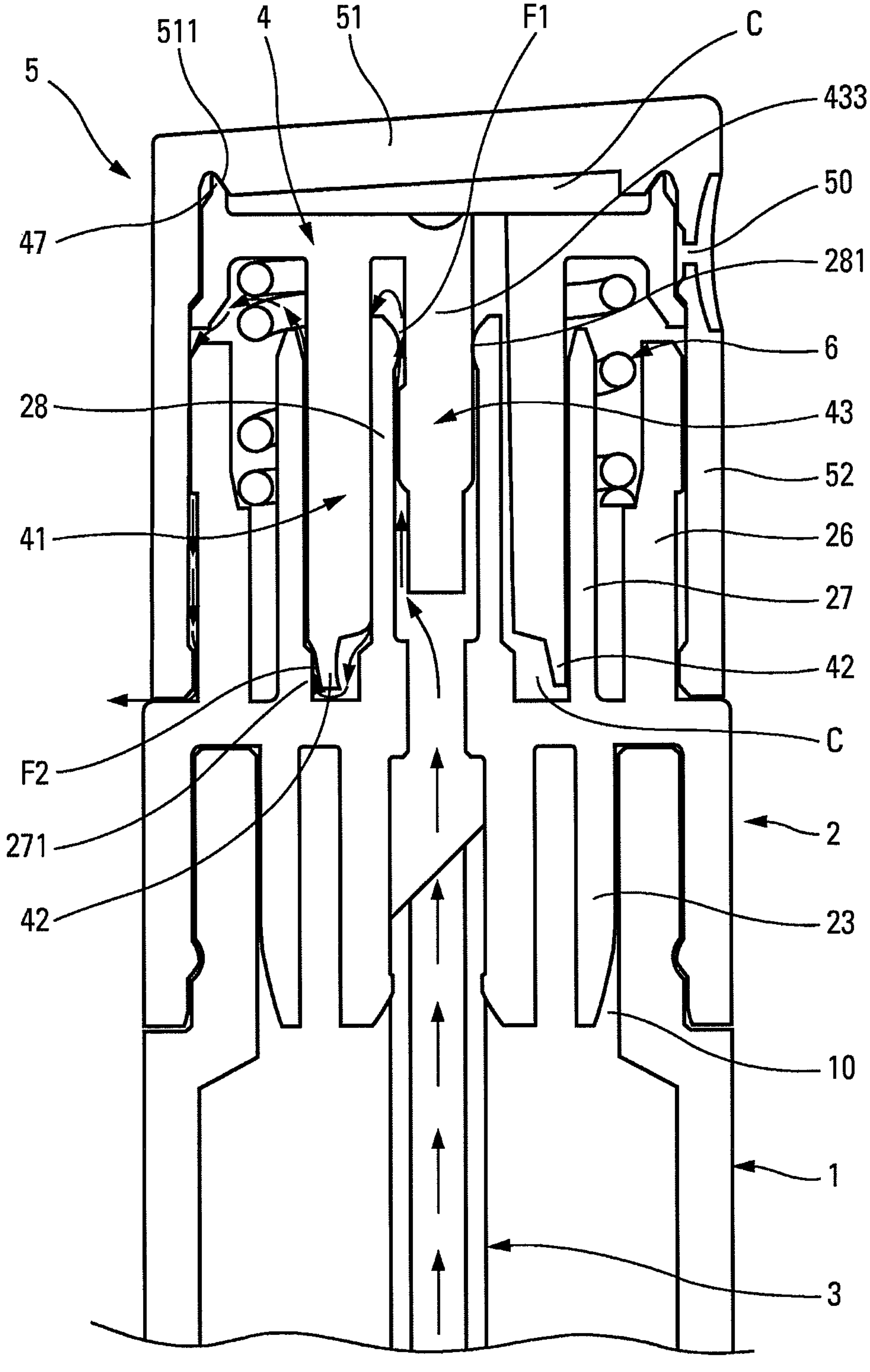

FIGS. 1 and 2 are fragmentary vertical section views through a fluid dispenser of the invention in its rest position and in its depressed position respectively.

Reference is made to both figures, initially to describe the structure of a fluid dispenser of the invention, then to describe its operation. The dispenser comprises a plurality of component elements, namely: a reservoir 1, and a dispenser member that, in the embodiment, is a pump, but it could also be a valve. The pump comprises a body 2, a dip tube 3, a differential piston 4, a pusher 5, and a return and pre-compression spring 6. In this embodiment, the dip tube 3 is fitted on the body 2, but, alternatively, it is possible for the dip tube to be made integrally with the body 2. In addition, the spring 6 is an independent part, but, in a variant, it is possible for it to be made integrally with the body 2 or with the differential piston 4. Consequently, the pump of the invention comprises three to five component elements.

The reservoir 1 is for containing the fluid to be dispensed. It can be made of glass, of metal, or of plastics material. Its capacity can be about two to three millimeters for samples or it can be much greater for conventional reservoirs. The reservoir can present any appropriate shape. It comprises a bottom wall (not shown), a side wall (shown in part), and an opening 10 that is defined by a neck 11 in this embodiment. The neck 11 includes a peripheral annular groove 12 in its outside wall. The neck 11 also includes an inside wall 14 that is used to provide sealing with the pump, as described below. The neck 11 also defines a top annular edge 13. Below the neck 11, the reservoir forms an outer shoulder 15 that is oriented upwards. This is only one particular embodiment for the reservoir. In very general manner, it suffices that it defines a working volume for storing fluid, and an opening via which the fluid can be removed from the reservoir.

The pump used to illustrate the present invention is of the “pusher-pump” type, which is particular in that the pusher forms a portion of the pump chamber as designated overall by the reference C. In most configurations, the pusher also defines a slide cylinder for the piston.

The pump body 2 may be made by injection molding an appropriate plastics material. Advantageously, the body is a part that is circularly symmetrical about the axis X shown in FIG. 1. In very general manner, the body comprises two series of three concentric tubes that extend on either side of a radial disk 25 that has an inlet channel 20 passing through its center.

More precisely, the series of three concentric tubes that extends downwards from the disk 25 includes an outer fastener ring 21 that is provided on its inside wall with a fastener bead 22 that is adapted to come to snap-fasten in the groove 12 of the neck 11. The ring 21 is the tube that is situated outermost. Inside the ring 21, the body 2 includes a self-sealing cylindrical cuff 24 that comes into leaktight contact with the inside wall 14 of the neck 11. Inside the cuff 24, the body forms a connection sleeve 23 inside which there is engaged the top end of the dip tube 3 that extends into the reservoir 1 to the proximity of its bottom wall. The connection sleeve 23 extends axially, forming the inlet duct 20. The ring 21, the cuff 24, and the sleeve 23 extend downwards from the annular radial disk 25. While the body 2 is being mounted on the neck 11 of the reservoir, the self-sealing cuff 24 slides in leaktight manner against the inside wall 14 of the neck 11 over a relatively long axial stroke. At the end of the stroke, the bead 22 is engaged by snap-fastening in the groove 12. This corresponds to the final assembled position of the body 2, and thus of the pump, on the reservoir.

The series of three tubes that extend upwards from the disk 25 includes an outer guide bushing 26 that is situated outermost. The guide bushing 26 defines a downward shoulder 261 that serves as an abutment, as described below. Internally, the bushing 26 serves as a bearing surface for the spring 6 that is housed between the bushing 26 and the cylinder 27. Inside the bushing 26, the body forms a slide cylinder 27 that presents an inside wall that is essentially cylindrical. In the invention, the inside wall of the cylinder forms at least one step or rib that defines a discontinuity 271 in the cylindricity of the cylinder. Its function is explained below. Inside the cylinder 27, the body further defines an inlet pipe 28 that internally defines a portion of the inlet duct 20. The free top end of the pipe 28 forms a sliding sealing bead 281, as described below.

The inlet duct 20 thus puts the pipe 28 into direct communication with the dip tube 3. It should be noted that there is no vent system or passage between the body and the reservoir.

The differential piston 4 includes a hollow axial tube 41 having a free end that defines a main piston lip 42 that is adapted to slide in leaktight manner inside the cylinder 27 of the body 2. Advantageously, the lip 42 is elastically deformable. Inside the tube 41, the differential piston 4 includes a rod 43 that performs the function of a movable inlet valve member. The rod 43 advantageously defines three sections, namely: a small-diameter bottom section 431 or groove; an intermediate section 432 of maximum diameter; and a top section 433 defined with at least one projecting or recessed portion in relief 434. In the figures, the portion in relief is in the form of one or more grooves that advantageously extend axially. The rod 43 is engaged inside the pipe 28 so that the sealing bead 281 is positioned at the bottom section 431 of small diameter when the pump is at rest, as shown in FIG. 1. There is thus no leaktight contact between the bead 281 and the rod 43. Functionally, the pipe 28, or more precisely its sealing bead 281, co-operates with the rod 43 so that together they form the inlet valve of the pump. Consequently, as described above, the inlet valve is open in the rest position, since there is no contact between the bead 281, that acts as an inlet valve seat, and the rod 43, that acts as a movable inlet valve member. It should easily be understood that downward axial displacement of the differential piston relative to the body 2 brings the intermediate section 432 up to, and into leaktight contact with, the bead 281 over a certain stroke. Beyond the intermediate section 432, the bead 281 is situated at the top section 433 that forms grooves 434; at that moment, there is no sealing between the bead 281 and the rod 43. This is explained in greater detail below.

In addition, the differential piston 4 forms a connection channel 44 that passes through the tube 41. At its top end, the differential piston 4 forms an annular flange 45 that extends radially outwards. Over its outer periphery, the flange 45 forms a differential piston lip 46 and an annular collar 47 that serves as an outlet-valve movable member, as described below. The spring 6 bears under the annular flange 45.

The pusher 5 includes a top bearing plate 51 on which the user can press by means of one or more fingers. Over its outer periphery, the plate extends downwards, forming a skirt 52 that is substantially cylindrically shaped in this embodiment. In the proximity of its top end where it is connected to the plate 51, the skirt 52 defines an internal dispenser wall 53 in which a dispenser orifice 50 is formed. In an advantageous embodiment, the wall 53 also forms channels and a swirl chamber 54 that are centered on the orifice 50. Below the dispenser wall 53, the skirt 52 forms a slide cylinder 55 that presents a diameter that is slightly greater than the diameter of the dispenser wall 53. At its bottom end, the skirt 52 forms an internal abutment reinforcement 56 that becomes housed below the shoulder 261 of the guide bushing 26. The skirt 52 also performs a guide function, being engaged around the top portion of the guide bushing 26. The abutment reinforcement 56 prevents the pusher 5 from being removed from the body 2 and it defines the rest position. The plate 51 includes a bottom inside wall that forms a portion of the pump chamber. In addition, at its outer periphery, the plate 51 forms an outlet-valve seat 511 that presents a configuration that is generally frustoconical.

The differential piston 4 is engaged inside the pusher 5 in such a manner that its lip 46 comes into leaktight sliding contact with the slide cylinder 55. In addition, the collar 47 comes into leaktight contact with the seat 511 in the rest position, as shown in FIG. 1. In this position, the spring 6 urges the differential piston 4 against the plate 51, away from the body 2. As mentioned above, the tube 41 is engaged inside the cylinder 27 and the rod 43 is engaged inside the pipe 28. Thus, the pump chamber C defines a low portion formed between the cylinder 27 and the pipe 28 and a high portion formed between the flange 45 and the plate 51. The two portions communicate with each other through the connection channel 44 that extends through the piston 4.

A complete normal operating cycle of the dispenser from its rest position to its depressed position shown in FIG. 2 is described below.

In the rest position, the spring 6 that bears against the internal shoulder of the bushing 26 urges the differential piston 4 away from the body 2. This causes the collar 47 of the piston 4 to be pressed against the seat 511 of the plate 51. Thus, the pusher 5 is also urged away from the body 2, and the rest position is defined when the abutment reinforcement 56 comes into abutment against the shoulder 261 of the bushing 26. The pump chamber C is thus isolated from the outside by the leaktight contact between the collar 47 and the seat 511. In addition, the main piston lip 42 is at its highest position inside the cylinder 27. With regard to the inlet valve, it is open, since the bead 281 does not come into leaktight contact with the rod 43. The pump chamber C thus communicates only with the reservoir, through the inlet duct 20 and the dip tube 3.

When the pusher 5 is depressed axially from the rest position in FIG. 1, the differential piston 4 is driven axially downwards in such a manner that the intermediate section 432 of the rod 43 is engaged in leaktight manner in the annular bead 281 of the pipe 28. The inlet valve is thus closed and the chamber C no longer communicates with the reservoir. The pressure rises inside the chamber C, and as a result of the difference in area between the bottom portion and the top portion of the chamber, the differential piston 4 moves away from the plate 51, thereby opening the outlet valve formed by the collar 47 and the seat 511. The chamber C thus communicates with the outside and the fluid under pressure can be dispensed through the orifice 50. In order for the outlet valve to open, it is necessary for the pressure inside the chamber to be greater than the force exerted by the spring 6.

By continuing to press on the pusher, the depressed position shown in FIG. 2 is reached. The outlet valve is closed once again, since the pressure has dropped inside the chamber that is isolated once again from the outside. It should thus be observed that the bead 281 is positioned at the top section 433 that is formed with the grooves 434, and that the main piston lip 42 is situated at the discontinuity 271. In this position, the inside of the reservoir communicates with the outside through a first escape path F1 that is established at the bead 281, and with a second escape path F2 that is established at the lip 42. The passage of air is shown by the arrows.

By relaxing the pressure exerted on the pusher, the differential piston rises under the action of the spring 6. The lip 42 returns once again into its leaktight contact position in the cylinder 27, and the inlet valve is closed. Suction forms inside the chamber C, and when the inlet valve returns once again into its rest position in FIG. 1, fluid coming from the reservoir, through the dip tube 3, once again fills the chamber. This corresponds to a normal operating cycle of the dispenser.

The present invention is particularly advantageous, not in the normal operating cycle of the dispenser, but while the pump is being mounted on the reservoir and while the pump is being primed. While the pump is being mounted on the reservoir, the self-sealing cuff 24 slides in leaktight manner over a certain stroke against the inside wall 14 of the neck 11. This would normally cause the pressure inside the reservoir to increase considerably, particularly when said reservoir is of small capacity. By means of the escape paths F1 and F2, the air put under pressure inside the reservoir can escape to the outside, following the arrowed path in FIG. 2. Furthermore, this venting of the reservoir and of the chamber makes it easy to prime the pump automatically. Given that the chamber C is at atmospheric pressure in the depressed position corresponding to its minimum volume, as soon as the pusher is released, the inlet valve is closed and the suction that forms inside the chamber makes it possible to suck the fluid into the pump chamber, thereby priming the pump. This simultaneous operation of venting the reservoir and of priming the chamber can be performed while the pump is being mounted on the reservoir, using a press that presses on the pusher. The force exerted by the press firstly snap-fastens the ring 21 on the neck 11, and secondly puts the pump into its depressed position.

Another advantageous characteristic of the invention resides in the fact that the escape path F1 is established before the escape path F2, so that the chamber C communicates firstly with the reservoir, then only subsequently with the outside. In other words, the higher pressure that exists inside the reservoir is balanced firstly with the chamber, then the residual increased pressure is balanced with the outside at atmospheric pressure. This staggering or sequencing of the opening of the escape paths F1 and F2 also makes it possible to avoid any risk of fluid leaking during normal operation of the dispenser. Since the escape path F1 is opened before the escape path F2, the fluid remaining in the chamber C in the proximity of the depressed position, when the outlet valve is closed, is constrained to flow towards the reservoir through the escape path F1, and not through the escape path F2 that is still closed. The pressure in the chamber is no longer enough to keep the outlet valve open, but it is nevertheless greater than atmospheric pressure or the pressure that exists in the reservoir. Opening can be staggered very simply by ensuring that the sealing between the bead 281 and the rod 43 is interrupted before the leaktight contact between the lip 42 and the cylinder is interrupted. It is very simple to determine the height of the ribs and/or grooves that makes it possible to establish the escape paths. Naturally, the grooves 434 of the rod can be replaced by any appropriate configuration that makes it possible to interrupt the sealing between the pipe 28 and the rod 43. In addition, the ribs or steps 271 that are formed on the cylinder can be replaced by any configuration that makes it possible to interrupt the sealing with the lip 42.

It should be observed that the second escape path F2 is distinct from the outlet valve, such that the air is driven out of the chamber through the escape path F2 even though the outlet valve is, and remains, closed.

The vent system of the present invention thus makes it possible not only to avoid any increased pressure inside the reservoir and to prime the pump, but it also makes it possible to avoid any risk of leakage during normal operation of the pump, and this advantageously by means of implementing two distinct escape paths that are not opened simultaneously.

The invention claimed is:

1. A fluid dispenser comprising:

a fluid reservoir (1) provided with an opening (10); and a dispenser member (2, 3, 4, 5, 6) mounted on the opening (10) of the reservoir, the member forming a fluid chamber (C) that is provided with an inlet valve (28, 43), an outlet valve (47, 511), and a lip (42) that is movable in leaktight sliding in a cylinder (27) between a rest position and a depressed position, so as to cause the volume of the chamber (C) to vary, and the fluid in the chamber to be driven through the outlet valve towards a dispenser orifice (50);

wherein in the proximity of the depressed position, the inlet valve defines a first escape path (F1) that puts the reservoir (1) into communication with the chamber (C), the chamber, in the proximity of the depressed position, communicating with the outside through a second escape path (F2) that does not pass via the outlet valve and the dispenser orifice so that, in the proximity of the depressed position, the reservoir (1) and the chamber communicate with the outside through the open first and second escape paths (F1 and F2), and with the outlet valve closed.

2. A dispenser according to claim 1, wherein the first escape path (F1) is opened before the second escape path (F2) so that the chamber (C) communicates with the reservoir (1) before the chamber communicates with the outside.

3. A dispenser according to claim 1, wherein the sliding of the lip (42) against the cylinder (27) ceases to be leaktight in the proximity of the depressed position, so as to establish the second escape path (F2).

4. A dispenser according to claim 3, wherein the cylinder (27) forms at least one discontinuity (271) over which the lip (42) passes, thereby creating the second escape path (F2).

5. A dispenser according to claim 1, wherein the inlet valve comprises two elements (28, 43) that are engaged to slide in leaktight manner one inside the other, except in the rest position in which the valve is open, and in the proximity of the depressed position so as to establish the first escape path (F1).

6. A dispenser according to claim 5, wherein one (43) of the elements forms at least one profile (433) over which the other element (28) passes, thereby creating the first escape path (F1).

7. A dispenser according to claim 1, wherein the dispenser member comprises:

a body (2) for mounting on the opening (10) of the reservoir (1), the body forming the cylinder (27);

a pusher (5) that is axially movable down and up on the body (2) between the rest position and the depressed position; and a differential piston (4) including a first lip (42) that is engaged to slide in leaktight manner in the cylinder (27) of the body, and a second lip (46) that is engaged to slide in leaktight manner in the pusher (5).

8. A dispenser according to claim 7, wherein the body (2) forms an inlet pipe (28), and the differential piston (4) forms a rod (43) that is engaged to slide in leaktight manner in the pipe (28) in such a manner as to co-operate to define the inlet valve, the rod forming at least one profile (434) where the pipe (28) is not in leaktight contact, thereby establishing the first escape path (F1).

9. A dispenser according to claim 7, wherein the dispenser member includes a spring (6) that urges the differential piston (4) towards the pusher (5), away from the body (2).

10. A dispenser according to claim 1, wherein the dispenser member includes a self-sealing cuff (24) that comes into leaktight sliding contact with the opening (10) of the reservoir (1) while the dispenser member is being mounted on the reservoir.

11. The dispenser according to claim 1, wherein the dispenser member is a pump or a valve.

12. The dispenser according to claim 1, wherein the second escape path is downstream of the first escape path so that air in the reservoir can escape to the outside by passing through the first escape path and subsequently through the second escape path.

13. A fluid dispenser comprising:

a fluid reservoir provided with an opening; and a dispenser member mounted on the opening of the reservoir, the member forming a fluid chamber provided with an inlet valve, an outlet valve, and a lip movable in sliding leaktight manner in a cylinder between a rest position and a depressed position, so as to cause the volume of the chamber to vary and the fluid in the chamber to be driven through the outlet valve towards a dispenser orifice;

when the lip is in the depressed position, the inlet valve defines a first escape path that puts the reservoir into communication with the chamber, the chamber, when the lip is in the depressed position, communicating with the outside through a second escape path that does not pass via the outlet valve and the dispenser orifice so that the reservoir and the chamber communicate with the outside through open first and second escape paths, with the outlet valve closed, wherein the second escape path is downstream of the first escape path so that air in the reservoir can escape to the outside by passing through the first escape path and subsequently through the second escape path.

14. The dispenser according to claim 13, configured so that the first escape path opens before the second escape path so that the chamber communicates with the reservoir before the chamber communicates with the outside.

* * * * *